United States Patent [19]

Smiley

[11] 4,026,828

[45] May 31, 1977

[54] FOAMED THERMOSET ARTICLES AND PROCESSES

[75] Inventor: Leonard H. Smiley, Jenkintown, Pa.

[73] Assignee: Rohm and Haas Company, Philadelphia, Pa.

[22] Filed: June 13, 1975

[21] Appl. No.: 587,196

[52] U.S. Cl. .................... 260/2.5 N; 264/45.3; 264/54; 264/55; 264/DIG. 5; 264/DIG. 17
[51] Int. Cl.² ........................................ B29D 27/00
[58] Field of Search .............. 264/DIG. 17, 51, 54, 264/45.3, 55, DIG. 5; 260/2.5 N

[56] References Cited

UNITED STATES PATENTS

| | | | |
|---|---|---|---|
| 2,764,566 | 9/1956 | Simon et al. | 264/DIG. 17 |
| 3,215,650 | 11/1965 | Julius et al. | 264/DIG. 17 |
| 3,239,424 | 3/1966 | Culk | 264/DIG. 17 |
| 3,256,218 | 6/1966 | Knox | 264/DIG. 17 |
| 3,332,895 | 7/1967 | Munn | 264/DIG. 17 |
| 3,441,523 | 4/1969 | Dwyer et al. | 264/DIG. 17 |
| 3,802,949 | 4/1974 | Brown et al. | 264/DIG. 17 |
| 3,867,495 | 2/1975 | Heller | 264/DIG. 17 |
| 3,878,278 | 4/1975 | Miller et al. | 264/DIG. 17 |
| 3,896,060 | 7/1975 | Plunguian et al. | 264/DIG. 17 |

*Primary Examiner*—Philip Anderson
*Attorney, Agent, or Firm*—Michael B. Fein

[57] ABSTRACT

Foamed thermoset articles are produced by introducing a thermosettable organic resin, a specific class of blowing agents, inorganic particulate filler, and glass fiber in a mold at a given temperature and pressure, and then lowering the mold pressure to a predetermined reduced pressure to cause foaming, and completing the foaming before gelation. The foamed thermoset articles are also disclosed.

10 Claims, No Drawings

FOAMED THERMOSET ARTICLES AND PROCESSES

BACKGROUND OF THE INVENTION

This invention relates to a novel thermoset foamed molded article and to a novel process for producing such thermoset foams. Thermoset moldings from acrylics, polyesters, vinyl esters and other thermosettable resins are well known. A technique for molding thermoset articles from such resins which has become very popular is known as the SMC (sheet molding compound) technique wherein a chemical thickener is added to the thermosettable resin along with fibrous reinforcement and particulate filler and formed into sheets, usually called SMC, which are allowed to thicken over periods of time ranging from a few hours to a few days before introducing the SMC into a mold. Pending patent applications of Kroekel et al, Ser. No. 770,085 of Oct. 23, 1968 and Bradley, Ser. No. 322,660 of Jan. 1, 1973, both of which are assigned to the assignee of the present application, are examples of such techniques. Although thermoplastic and thermoset resin foams such as polyurethanes, polyesters, polyvinyl chlorides, polypropylene, polyethylene, polyimides, and the like are very well known, no one has ever proposed foaming organic resins in compression mold, especially not by means of a chemical blowing agent. The SMC moldings of the prior art are rigid thermoset articles having many utilities, for example as snowmobile shrouds, automobile front ends and other sections, office equipment housings, and quite a wide variety of other utilities. However, it has always been desired to be able to decrease the weight of such articles, especially due to recent automobile industry objectives of reducing the weight of automobiles and in other industries to reduce shipping weight to conserve on energy.

It is an object of the present invention to provide a process of producing thermoset moldings of reduced weight per unit volume. It is a further object to produce foamed thermoset articles which are less dense than if unfoamed and are paintable.

These objects and others as will become apparent from the following description are achieved by the present invention which comprises in one aspect a process for preparing foamed thermoset articles comprising introducing in a mold a molding composition comprising about 90 to 98 parts by weight of a thermosettable organic resin, about 2 to 10 parts by weight blowing agent which chemically decomposes to generate gas at a temperature of about 50° to 160° C. and which does not prevent complete cure of the resin, about 50 to 300 parts by weight of inorganic particulate filler, and about 50 to 160 parts by weight of glass fiber; molding at about 4 to 10.5 million Newtons-m$^{-2}$ at a temperature of about 130 to 160° C. for about 0.1 to 10 seconds until the molding composition fills the mold cavity; reducing the mold pressure to about 0.51 to 2.1 million Newtons-m$^{-2}$ without opening the mold cavity; maintaining said reduced pressure for about 30 to 300 seconds at about the same temperature so as to allow foaming at the reduced pressure; causing said foaming to be completed before gelation occurs in the mold cavity.

Another aspect of the invention is the foamed thermoset articles which are produced by this process.

While any thermosettable organic resin can be used in the invention, the preferred resins are unsaturated polyester resins, thermosetting acrylic monomer/polymer syrups, and vinyl ester resins.

Suitable unsaturated polyester resins are any of the polyhydric alcohol polyfunctional acid or anhydride condensates. For example, propylene maleate-isophthalate, propylene maleate, propylene maleate-phthalate, propylene maleate-adipate, and any other polyester known in the art, including mixtures thereof. The unsaturated polyester is dissolved in unsaturated monomer such as styrene or methyl methacrylate and the like and upon cure become thermoset due to crosslinking between the unsaturated monomer and the unsaturation sites on the polyester. A low profile additive, such as the thermoplastic polymers disclosed by Kroekel et al, supra, is optional when lower shrink and smoother surface are desired.

Suitable thermosetting acrylic polymer monomer syrups are for example those disclosed by Bradley, supra, for example a solution of methyl methacrylate polymer in methyl methacrylate monomer and a polyethylenically unsaturated crosslinking monomer such as ethylene di-methacrylate.

Suitable vinyl ester thermosettable resins include bisphenol A-ethylene oxide adducts onto which are grafted methylacrylic or acrylic acid and the resultant ester dissolved in styrene or methyl methacrylate. About 90 to 98 parts by weight of such a thermosettable organic resin is used in the molding composition of the invention.

About 2 to 10 parts by weight of a blowing agent which chemically decomposes to generate gas at a temperature of about 50° to 160° C. and which does not prevent complete cure of the resin is also used in the molding composition. Suitable blowing agents and their decomposition temperatures in resin are ammonium carbonate (75°–150° C.), N,N'-dimethyl-N,N'-dinitrosoterephthalamide (110°–150° C.) and 2-t-butylazo-2-cyano-4-methoxy-4-methyl pentane (95°–100° C.) and azobisisobutyronitrile (100°–150° C.), the latter having the combined advantage of accelerating the reaction. The most preferred amount of blowing agent is about 6% by weight based on thermosettable resin and a most preferred catalyst is t-butyl perbenzoate because it allows for complete curing with short cycle times of 90 to 180 seconds. Mixtures of blowing agents can also be used. With such a catalyst, gelation in the press of the resinous mixture occurs within about 40 seconds of press closure under the preferred process conditions. In order to avoid delamination of the molded article, the blowing agent must be at least 80% decomposed before gelation occurs; otherwise large blisters and separation of the top and bottom halves of the molded articles occurs.

A very much preferred screening test for suitability of blowing agents is thermogravimetric analysis. Thermogravimetric analysis measurements on resin catalysts and blowing agent mixtures enables one to suitably select the proper blowing agent with relation to the press temperature and catalysts. For example, at 150° C. t-butyl perbenzoate is the preferred catalyst since it results in a very complete cure in less than 3 minutes. The decomposition temperatures in catalyzed resin by thermogravimetric analysis of the following blowing agents shows that they are outside of the class of blowing agents used in the invention and, in practice, these blowing agents do not function properly in the invention due to delamination or other problems:

| UNSUITABLE BLOWING AGENTS | DECOMPOSITION TEMPERATURE (° C.) |
|---|---|
| N,N'-dinitrosopentamethylenetetramine | 160–235 |
| 1,1'-azobisformamide | 225–245 |
| 4,4'-oxybis (benzenesulfonyl hydrazide) | 115–170 |
| benzene sulfonyl hydrazide | 115–170 |
| toluene-4-sulfonyl hydrazide | 140–170 |
| p-toluenesulfonyl semicarbazide | 235–260 |

Although suitable blowing agents must be almost totally decomposed at the press temperature, they must also be reasonably stable before molding, and thus a minimum decomposition temperature to satisfy this criterion is 50° C.

Another criteria for selection of the blowing agent is that it must not prevent complete cure of the resin. By this is meant that it must not contain decomposition products such as sulphur which inhibit the vinyl polymerization of the thermosetting resin in the press which cause incomplete cure and delamination of the molded article due to volatilization of monomer after gelation. An example of a blowing agent which is unsuitable because it interferes with the curing of the resin is 5-morpholyl-1,2,3,4-thiatriazole.

The molding composition further includes about 50 to 300 parts by weight inorganic particulate filler. Any of the fillers well known in the art of thermoset moldings are suitable, for example, clay, silicas, calcium carbonate, alumina, alumina trihydrate, feldsbars, and the like.

Fiber, especially glass fiber, is included in the amount of about 15 to 160 parts by weight. Typically the glass fiber is about 0.6 to 5.1 cm in length.

Although bulk molding, compound and premix compound formulations are very suitable, the preferred method in the current art is SMC which involves incorporation of a small amount of a chemical thickener such as oxides and dihydroxides of magnesium or calcium. Preferably about 0.5 to about 3 parts by weight chemical thickener is incorporated in the molding composition and the molding composition is allowed to thicken over a period of at least 1 day before molding.

Small amounts of catalyst, release agent and surfactant are also incorporated in the SMC composition. Suitable catalysts include t-butyl peroctoate, t-butyl perbenzoate, and 2,5-dimethyl-2,5-di(t-butyl peroxy)-hexane. The molding condition used in the process of the invention involves a first application of high pressure to flow the molding compound in the mold cavity followed by a constant application of a low pressure during cure so as to allow foaming to take place. The press temperature during both molding steps is about the same, i.e., about 130° to 160° C. The first higher pressure molding is preferably at about 4 to 10.5 million Newtons-m$^{-2}$ for about 0.1 to 10 seconds and the reduced or lower molding pressure is preferably about 0.51 to 2.1 million Newtons-m$^{-2}$. It is important not to open the mold cavity when reducing the pressure from the higher to the lower cycle. The reduced pressure is maintained for about 30 to 300 seconds and all conditions taken together must be such as to cause foaming to be completed before gelation occurs in the mold cavity.

The foamed thermoset molded articles have substantially reduced densities as compared with analogous matched metal die thermoset molding which are not foamed. Densities in the range of 0.8 to 1.4 g-cm$^{-3}$ are typical of the foamed moldings of the invention. Void formation actually takes place in the process of the invention so that the articles are indeed foams rather than the cure whitened articles described by Bradley, supra.

The articles produced in accordance with this invention are useful in any application which prior thermoset moldings are useful but where lighter weight or greater rigidity per unit weight would be an advantage such as automobile parts, luggage, machine housing, and the like.

EXAMPLES

The following non-limiting examples are presented to illustrate but a few embodiments of the invention. All parts and percentages are by weight unless otherwise indicated:

EXAMPLE I

The following ingredients are mixed in the order listed using a Cowles mixer:

50 parts polyesters consisting of 39 parts propylene fumarate; 14 parts MMA/EA/MAA (85/13/2) copolymer as low profile additive; and 47 parts styrene monomer; 3 parts N,N'-dimethyl-N,N'-dinitrosoterephthalamide, 70% by weight in mineral oil as blowing agent; 0.5 parts t-butyl perbenzoate as catalyst; 0.5 parts sodium lauryl phosphate as mold release agent; 44 parts Al (OH)$_3$, 0.5-1.5 $\mu$m as filler; 6 parts Al (OH)$_3$, 6.5-9.5 $\mu$m, as filler; 0.3 parts activated MgO as chemical thickener.

The viscosity of the mix was 350 poise. The mix was processed into SMC using a Finn and Fram SMC machine and the resulting SMC was matured at 23° C. for 72 hours. The amount of chopped glass, 2.5 cm in length, which was incorporated into the SMC was 27.5% based on the total weight of SMC. The SMC was then cut into pieces 20 cm by 20 cm and a stack of four of these pieces was compression molded in a Wabash press having chrome plated matched metal die molds. The temperature of the mold was 150° C.; the pressure was maintained at 6.2 million Newtons-m$^{-2}$ for 5 seconds, reduced to zero without opening the mold cavity, and raised to 1.2 million Newtons-m$^{-2}$ for 175 seconds. A rigid, foamed article of density 1.25 g-cm$^{-3}$ was obtained. The same SMC, if molded without foaming, has a density of 1.75 g-cm$^{-3}$.

EXAMPLE II

The following ingredients are mixed in order listed:

60 parts of a solution of 30% MMA/EA/MAA (93/7/2) copolymer in 50% styrene monomer and 20% divinyl benzene monomer; 3.6 parts azobisiosbutyronitrile; 0.6 parts t-butyl perbenzoate; 0.6 parts sodium lauryl phosphate; 40 parts kaolin as filler, 3-5 $\mu$m; 0.6 parts activated MgO.

Twenty-five parts of chopped glass strand (0.65 cm) are incorporated into the above mix by blending in a Baker-Perkins sigma blade mixer. The resulting bulk molding compound is matured for 24 hours, then molded under the conditions of Example I to give a rigid, foamed part with a density of 1.2 g-cm$^{-3}$. The same BMC, if molded without foaming has a density of 1.6 g-cm$^{-3}$.

EXAMPLE III

The following ingredients are mixed in order listed:

40 parts thermosettable acrylic resin consisting of 23% poly (MMA/EA/MAA) (93/7/2); 20% ethylene dimethacrylate, and 57% MMA monomer; 2.4 parts blowing agent 2-t-butylazo-2-cyanao-4-methoxy-4-methyl pentane; 0.4 parts catalyst t-butyl perbenzoate; 0.8 parts calcium stearate as release agent; 60 parts calcium carbonate filler, 2.5 mm; 0.4 parts chemical thickener (activated MgO).

Twenty-five parts of chopped glass strand (0.65 cm) are incorporated into the mix as in Example II. The resulting bulk molding compound is matured for 24 hours, then molded under the conditions of Example I to give a rigid, foamed part with a density of 1.4 g-cm$^{-3}$. The same BMC, if molded unfoamed, has a density of 1.8 g-cm$^{-3}$.

EXAMPLE IV

The following ingredients are mixed in order listed using a Cowles mixer:

55 parts of a vinyl ester thermosettable resin consisting of 38 parts bisphenol A/fumaric acid polyester, 46 parts styrene, and 15.6 parts of a butadiene/styrene/methacrylic acid (34.9/64.9/0.2) polymer; 3 parts N,N'-dimethyl-N-N'-dinitrosoterephthalamide as blowing agent; 0.5 parts t-butyl perbenzoate as catalyst; 1.0 part calcium stearate as mold release agent; 45 parts kaolin as filler, 4.0 μm; 0.9 parts activated MgO (Merck) as chemical thickener.

Chopped glass roving (27.5 parts) is added in making a sheet molding compound as in Example I. The sheet molding compound is matured and molded as in Example I. A foamed, rigid article of density 1.30 g-cm$^{-3}$ is obtained. The same SMC, molded without foaming, has a density of 1.80 g-cm$^{-3}$.

I claim:

1. A process for preparing foamed thermoset articles comprising introducing in a mold a molding composition comprising about 90 to 98 parts by weight of a thermosettable organic resin, about 2 to 10 parts by weight blowing agent which chemically decomposes to generate gas at a temperature of about 50°–160° C. and which does not prevent complete cure of the resin, about 50 to 300 parts by weight inorganic particulate filler, about 15 to 160 parts by weight of glass fiber; molding at about 4 to 10.5 million Newtons-m$^{-2}$ at a temperature of about 130° to 160° C. for about 0.1 to 10 seconds until the molding composition fills the mold cavity; reducing the mold pressure to about 0.51 to 2.1 million Newtons-m$^{-2}$ without opening the mold cavity, maintaining said reduced pressure for about 30 to 300 seconds at about the same temperature so as to allow foaming at the reduced pressure, causing said foaming to be completed before gelation occurs in the mold cavity.

2. The process of claim 1 wherein the blowing agent is selected from the group consisting of ammonium carbonate, N,N'-dimethyl-N,N'-dinitrosoterephthalamide, azobisisobutyronitrile, and 2-t-butylazo-2-cyano-4-methyl pentane.

3. The process of claim 1 wherein about 0.5 to 3 parts by weight chemical thickener is incorporated in the molding composition, and the molding composition is caused to thicken over a period of at least 1 day before molding.

4. The process of claim 3 wherein the molding composition is in the form of sheet molding compound.

5. The process of claim 1 wherein the thermosettable organic resin composition is selected from the group consisting of unsaturated polyester with monoethylenically unsaturated monomer; monoethylenically unsaturated acrylic monomer with acrylic polymer and polyethylenically unsaturated crosslinking monomer.

6. Foamed thermoset polyester molding produced by the process of claim 5.

7. Process of claim 1 wherein the thermosettable organic resin is an acrylic resin comprising monoethylenically unsaturated acrylic monomer, acrylic polymer, and polyethylenically unsaturated crosslinking monomer.

8. Process of claim 7 wherein the molding composition further includes a chemical thickener and the molding composition is in the form of sheet molding compound.

9. Foamed thermoset acrylic molding produced by the process of claim 7.

10. Foamed thermoset article produced by the process of claim 1.

* * * * *